US011839838B2

(12) United States Patent
Ma (10) Patent No.: US 11,839,838 B2
(45) Date of Patent: Dec. 12, 2023

(54) METHOD FOR SEPARATING MILL SCALE FROM WASTEWATER (71) Applicant: ARCELORMITTAL, Luxembourg (LU)

(72) Inventor: Naiyang Ma, Munster, IN (US)

(73) Assignee: ArcelorMittal, Luxembourg (LU)

(*) Notice: Subject to any disclaimer, the term of this patent is extended or adjusted under 35 U.S.C. 154(b) by 547 days.

(21) Appl. No.: 15/749,865

(22) PCT Filed: Sep. 6, 2016

(86) PCT No.: PCT/IB2016/001372
§ 371 (c)(1),
(2) Date: Feb. 2, 2018

(87) PCT Pub. No.: WO2017/037540
PCT Pub. Date: Mar. 9, 2017

(65) Prior Publication Data
US 2018/0229155 A1 Aug. 16, 2018

Related U.S. Application Data (60) Provisional application No. 62/214,550, filed on Sep. 4, 2015.

(51) Int. Cl.
B01D 21/26 (2006.01)
B01D 21/00 (2006.01)
(Continued)

(52) U.S. Cl.
CPC ......... B01D 21/26 (2013.01); B01D 21/0012 (2013.01); B01D 21/0042 (2013.01);
(Continued)

(58) Field of Classification Search
CPC ........ B21B 1/26; B01D 21/26; B01D 21/267; B01D 21/0042; B01D 21/2411;
(Continued)

(56) References Cited

U.S. PATENT DOCUMENTS 1,736,324 A * 11/1929 Townsend ............... B21B 1/26
72/39
2,810,633 A * 10/1957 Cooper ................... C22B 1/16
75/769
(Continued)

FOREIGN PATENT DOCUMENTS

| CN | 1417129 A | 5/2003 |
|---|---|---|
| KR | 20070077436 | 7/2007 |

(Continued)

OTHER PUBLICATIONS

HEADCELL brochure (Year: None).*
(Continued)

Primary Examiner — Liam Royce
(74) Attorney, Agent, or Firm — Davidson, Davidson & Kappel, LLC (57) ABSTRACT A method for collecting mill scale from a hot rolling mill is provided. The hot rolling mill includes a flume. The method includes transporting mill scale particles in wastewater, retrieving the wastewater from a flume of the hot rolling mill and separating the mill scale particles from the wastewater using a separator. A hot rolling mill and a method for retrofitting a hot rolling mill are also provided.

12 Claims, 10 Drawing Sheets (51) Int. Cl.
  *B21B 1/26* (2006.01)
  *B01D 21/24* (2006.01)
  *C02F 1/00* (2023.01)
  *C02F 1/38* (2023.01)
  *B21B 1/22* (2006.01)
  *B21B 1/02* (2006.01)
  *C02F 101/20* (2006.01)
  *C02F 101/32* (2006.01)
  *C02F 103/16* (2006.01)

(52) U.S. Cl.
  CPC ........ *B01D 21/2411* (2013.01); *B01D 21/267* (2013.01); *B21B 1/26* (2013.01); *C02F 1/004* (2013.01); *C02F 1/385* (2013.01); *B21B 2001/028* (2013.01); *B21B 2001/225* (2013.01); *C02F 2101/203* (2013.01); *C02F 2101/32* (2013.01); *C02F 2103/16* (2013.01); *Y02P 10/20* (2015.11)

(58) Field of Classification Search
  CPC ... B01D 21/0012; B01D 21/003; C02F 1/004; C02F 1/385; C02F 2101/203; C02F 2101/32; C02F 2103/16; Y02P 10/212; C22B 1/005
  See application file for complete search history.

(56) References Cited

U.S. PATENT DOCUMENTS

| | | | | |
|---|---|---|---|---|
| 3,258,123 | A * | 6/1966 | Fontaine | B01D 21/02 210/259 |
| 3,439,803 | A * | 4/1969 | Duval | B03C 1/00 209/13 |
| 4,091,826 | A * | 5/1978 | Bahrke | C22B 1/005 134/11 |
| 4,168,714 | A | 9/1979 | Bahrke | |
| 4,768,280 | A | 9/1988 | Palmer et al. | |
| 5,554,298 | A * | 9/1996 | Kochik | B01D 17/047 134/25.1 |
| 5,830,282 | A | 11/1998 | Olashuk | |
| 6,645,382 | B1 * | 11/2003 | Wilson | B01D 21/0045 209/725 |
| 6,811,697 | B2 * | 11/2004 | Davis | B01D 21/24 210/512.1 |
| 7,297,266 | B2 | 11/2007 | Cobb et al. | |
| 7,465,391 | B2 | 12/2008 | Heist et al. | |
| 2001/0054432 | A1 | 12/2001 | Olashuk et al. | |
| 2007/0172728 | A1 | 7/2007 | Yamashita et al. | |
| 2009/0301157 | A1 | 12/2009 | Schuster et al. | |

FOREIGN PATENT DOCUMENTS

| | | |
|---|---|---|
| KR | 20090007777 A | 1/2009 |
| RU | 2060069 C1 | 5/1996 |
| RU | 2165812 C1 | 4/2001 |

OTHER PUBLICATIONS

YouTube video https://www.youtube.com/watch?v=HBxCPDx3wRU (Year: 2013).*
Hydro International Grit snail YouTube video https://www.youtube.com/watch?v=T44LhZo51u4 (Year: 2013).*
Definition of pit by Merriam-Webster (Year: None).*
Steel industry sludge is being reused. 1975. Environmental Science & Technology 9:7:624-625. (Year: 1975).*
Ma: "In-Process Separation of Mill Scale From Oil at Steel Hot Rolling Mills," EPD Congress 2012, TMS (The Minerals, Metals & Materials Society), 2012, 323-329.

* cited by examiner

Toroidal Pattern in a CDS Unit
FIG. 5

METHOD FOR SEPARATING MILL SCALE FROM WASTEWATER

BACKGROUND

The present invention relates generally to separating mill scale from wastewater at hot rolling mills or in basic oxygen furnaces ("BOF").

Continuous deflective separation (hereinafter "CDS") is a filtration method for separating pollutants, like solids or particulate matter, from a flowing fluid stream. CDS units are the most popular devices used for storm water treatment. CDS units include a screen in an upper section and sump in a bottom section. The CDS units deflect the fluid stream inflow into a separation chamber. The screen removes the pollutants and allows the fluid to return to the stream. Floatable solids are kept in motion in the separation chamber so they do not clog the screen. Heavy solids settle to the bottom of the sump in the chamber.

U.S. Pat. No. 7,297,266 purportedly discloses separating particles from a fluid stream using a screen apparatus. The screen filters relatively large particulates from the fluid stream as the fluid stream passed from a storage chamber of the tank to a tank outlet. The screen is preferably shaped to substantially conform to the shape of a diverter to aid in the smoothing of the fluid flow within the retention section of the tank.

U.S. Pat. No. 7,465,391 purportedly discloses an apparatus for separating solid matter from a liquid stream using continuous deflective separation. The apparatus includes a cylindrical separation panel surrounding an interior space which is oriented to have a substantially vertical longitudinal axis.

Hot rolling mills are known in the steel industry.

Basic Oxygen Furnaces ("BOF") are also known in the steel industry.

BRIEF SUMMARY OF THE INVENTION

The present invention provides retrieving mill scale from flumes in a hot rolling mill or basic oxygen furnace to retrieve mill scale with less oil contamination.

The present invention provides a method for collecting mill scale from a hot rolling mill or basic oxygen furnace comprising the steps of transporting mill scale particles in wastewater, retrieving the wastewater from a flume of the hot rolling mill or basic oxygen furnace and separating the mill scale particles from the wastewater using a separator.

The present invention provides a hot rolling mill comprising a reheat furnace for reheating a steel slab, at least one stand for processing the steel slab downstream of the reheat furnace, a flume connected to the at least one stand transporting mill scale particles and wastewater and a separator for separating mill scale particles from the wastewater in the flume.

The present invention may also provides a basic oxygen furnace comprising a separator. The separator may directly connect to a dewatering device.

The present invention also provides using separators to separate the mill scale particles from the wastewater and preferably provides using grit separators or continuous deflective separation separators to collect mill scale.

The present invention further provides a method of retrofitting a mill including placing a separator into the flume. A basic oxygen furnace may also be retrofit with a separator.

The method may also include any of the following features, taken alone or in combination:

collecting the mill scale particles;
washing the collected mill scale;
dewatering the collected mill scale;
the wastewater is turbulent or running at high speeds in the flume;
the separator is provided downstream from a reheat furnace, scalebreaker, roughing stand, cooling stand or finishing stand;
the separator is located in the flume;
the separator is located upstream of a pit;
directing the remaining wastewater downstream in the hot rolling mill; and
the remaining wastewater is directed to a pit.

The hot rolling mill may also include any of the following features, taken alone or in combination:

a pit downstream of the flume;
the at least one stand is a scalebreaker, roughing stand, cooling stand, finishing stand, cooling and run out table or coiler;
a washing device downstream of the separator; and
a dewatering device downstream of the separator.

BRIEF DESCRIPTION OF THE DRAWINGS

A preferred embodiment of the present invention will be elucidated with reference to the drawings, in which.

DETAILED DESCRIPTION OF A PREFERRED EMBODIMENT

Basic Oxygen Furnaces ("BOF") used in the steelmaking process generate byproducts including filter cake and spark box slurry. The filter cake is typically sent to a landfill. The spark box slurry is hauled away frequently.

In addition, hot rolling mills produce finished steel products from semi-finished steel products, which may include slabs, ingots, billets and/or blooms, or any other long carbon product. The hot rolling mills reheat semi-finished steel products (slabs in this example), roll the slabs so the slabs are longer and thinner, and then coil the length of the steel sheets for downstream processing. During this process, solid waste is generated. This waste in addition to the filter cake and spark box slurry, also known as grit or mill scale, is a byproduct of finished steel products. Mill scale is rich in iron, typically, greater than 70% wt iron, for example. Mill scale can be an excellent iron resource if it is not contaminated with oil, grease or other tramp. However, high oil concentration in mill scale is a major obstacle for recycling mill scale in hot rolling mills. Oily mill scale may cause volatile organic compound (hereinafter "VOC") emissions violations and cannot be used in sintering and blast furnace ironmaking. The oily mill scale may cause equipment failure and baghouse fires. Oily mill scale is often disposed of at landfills that may be costly. Under current market conditions, clean mill scale is $20/ton higher than oily mill scale. Clean mill scale may be briquetted and used in ironmaking and steelmaking process. Grit or mill scale may be recycled with a profit. Consequently, it is desirable to develop a cost-effective technology to separate grit from the BOF wastewater.

Mill scale is a layer of oxidized iron that forms on the surface of the slab. There are two types of mill scale, primary and secondary. Primary mill scale is formed in the reheat furnaces while secondary mill scale is formed downstream from the reheat furnaces, for example, in the roughing and finishing mills. Primary scale is generally clean and oil free because any oil present is burned off instantly since temperatures in the reheat furnaces are about 1200° C. Most mill scale is primary scale formed in reheat furnaces.

The thickness or mass of formed scale layers on steel surface changes with time:

$$\Delta m = A e^{-E/RT} \sqrt{t}$$

wherein $\Delta m$ is total mass of formed mill scale layers on steel surface, A is a temperature-independent coefficient related to gas atmosphere, T is temperature, E is activation energy, R is gas constant and t is time elapsed.

In the hot rolling mills, steel slabs are reheated in reheating furnaces and transported via hot rolling trains to descaling units. The descaling units remove the primary scale from the slabs with pressurized water. Spray headers may blast the slabs with 1500 psi pressurized water. A downstream scalebreaker roller may be used to break up any scale that remains. Sweep sprays may be used to clean away any other loosened scale that remains on the surface.

The slabs are then rolled by roughing mills, cropped and descaled again to remove secondary scale. The secondary scale is scale that has regrown since the slab exited the furnace, for example, during the time in the roughing mill. High pressurized water jet nozzles clean the scale from the surface of the slabs during and after the roughing mills. The slabs are then run through finishing mills which reduce the thickness of the slabs to a desired gauge, the slabs are then cooled, coiled and ready for transport.

Oil and grease are present throughout the hot rolling process. Bearings are lubricated with grease and hydraulic machines are operated with oil containing fluids. Work rolls are also lubricated with oil-containing lubricants. Grease and oil that leak from the machinery and mill components find their way into the cooling water used during the hot rolling process resulting in oily wastewater. When this oily wastewater carries the mill scale, oil sticks to and coats the surface of the mill scale particles, thereby contaminating the mill scale. Oil may be present in amounts greater than 0.15% wt.

Being able to separate the grit or mill scale from the oil is necessary. Separation of the grit or mill scale will reduce the cost of hot steel mill wastewater treatment cost and landfill costs due to the reduction of oily sludge generation. Separation will also reduce the BOF wastewater treatment cost and the BOF grit may be recycled with a profit.

Possible solutions include before-process separation, post-process separation and in-process separation. Before-process separation includes eliminating oil from the hot rolling process or preventing oil from getting into the wastewater. Post-process separation includes removing oil from the oily mill scale and sludge by thermal deoiling, solvent extraction or intensive washing. In-process separation includes separating mill scale particles from oil and wastewater while the wastewater is flowing in flumes at high speed.

Conventional practice provides three chances for oil to coat the mill scale particles: (1) countermovement between oil and mill scale in pits; (2) digging settled mill scale through oily water surfaces; and (3) foreign oily materials.

In-process separation includes advantages over conventional practice. The inventors have discovered that mill scale particles resist being coated with oil in the turbulent waters of the flumes. As a result, if mill scale is collected directly from the flume water while the flume water is moving at high speed, the mill scale will be clean and recyclable. So extracting clean mill scale from the flumes during in-process separation is desirable. Excess energy of the flume waters is used so no additional energy is needed to separate the mill scale from the oil. Furthermore, no additional environmental protection measures are needed.

The inventors have discovered that mill scale particles can be separated from oil and wastewater "in process" while the wastewater is moving in flumes at a high velocity according to the following:

$$c = \frac{hu\tau}{dp}, \% \text{ wt}$$

wherein c is oil concentration in the collected mill scale in % wt, h in $g/(mm^2 \cdot s)$ is a coefficient related to wastewater temperature and chemistry, u is oil content in wastewater in % wt before the scale is collected, $\tau$ is contact time in s between scale particles and oil droplets before the scale is collected, and d in mm and p in $g/mm^3$ are size and density of the collected scale.

In a first example, scale collected from flume water is cleaner than scale collected by conventional methods in which the scale is collected from the pits. Box 1 represents the pit connected to the central flume. Box 2 represents the pit connected to the north flume and box 3 represents the pit connected to the south flume. The oil concentration in mill scale from the flumes is about 10 times lower than the scale collected from the pits represented by Boxes 1 to 3.

TABLE 1

| Oil Concentration in Mill Scale, % wt | | | | | |
|---|---|---|---|---|---|
| Location | Source | May 5, 2015 | Jun. 26, 2015 | Jul. 15, 2015 | Average |
| North Flume | Finishing |  | 0.05 | 0.02 | 0.04 |
| Central Flume | Finishing | 0.09 | 0.03 | 0.1 | 0.07 |
| South Flume | Roughing | 0.21 | 0.34 | 0.26 | 0.27 |
| Box 1 - Central Flume | Finishing |  | 0.9 | 1.69 | 1.30 |
| Box 2 - North Flume | Finishing |  | 0.31 | 0.23 | 0.27 |
| Box 3 - South Flume | Roughing |  |  | 5.15 | 5.15 |

The present inventors have also discovered that the location of the separators in the flumes for retrieval of the mill scale is important. Locating separators closer to the source provides for collection of mill scale with sufficiently low oil content, for example, less than 0.15% wt. Highly efficient and economical separators should be used to implement this process. Such separators, may be, for example, grit separators or CDS separators, however, other types of separators may also be used.

The separators should be effective, cheap and simple. The separator must be able to capture mill scale particles from high-speed flume water while not allowing oil to contaminate the captured mill scale. The separator should not introduce any additional environmental issues or concerns.

A grit separator may be preferred. For example, the HEADCELL grit and sand separator from International Hydro may be preferred. This separator receives wastewater from the flumes and separates the wastewater from the grit or mill scale and volatile solids. The grit is then washed and dewatered. The grit separator separates the mill scale from the wastewater and oil. The clean mill scale will then be dewatered so the clean mill scale can be used internally or sold. The wastewater then brings the oil and remaining flow to the existing pit and wastewater treatment system.

In a second example, oily mill scale was washed with clean, turbulent water. The mixture was strongly stirred for five minutes. The scale was allowed to settle for 20 minutes. Water was poured out and the scale was analyzed for oil. The clean, turbulent water removed oil from the scale.

TABLE 2

| Oil Concentration in Mill Scale, % wt Pit #2 Mixed Scale | |
|---|---|
| Before Washing | After Washing |
| 0.7 | 0.51 |
| 0.54 | 0.38 |

In a third example, a scalper machine was installed at an entry point of the first pit. The wastewater enters at a high speed. The scalper scoops scale out of the wastewater and dumps the scale on a conveyor. The scalper pit scale produces about 30,000 NT/year and has an oil content of less than 0.05% wt whereas the pit scale has an oil content of 0.4% wt and produces about 10,000 NT/year. A mixture of scalper pit scale and pit scale resulted in an oil content of 0.18% wt. The ability to retrieve clean mill scale reduces costs associated with oily mill scale and landfills.

Figure 1:
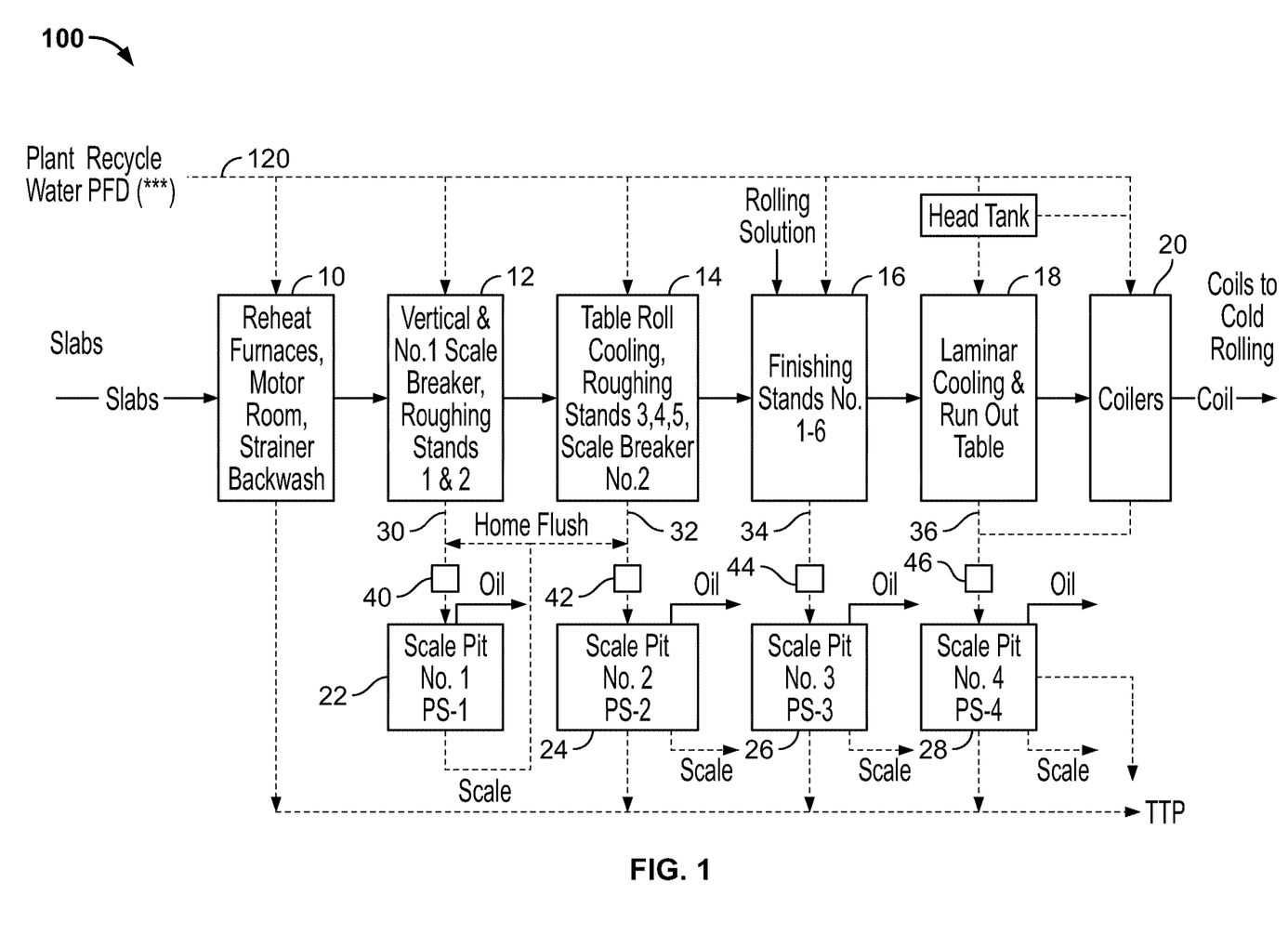
FIG. 1 shows a schematic drawing of a hot rolling mill including separators in accordance with the present invention.

FIG. 1 shows a hot rolling mill 100 in accordance with the present invention. Slabs 110 enter reheat furnaces 10 for reheating up to a desired temperature, for example, 1200° C. The slabs are then transported to the primary scalebreaker stands 12 for descaling. Slabs 110 continue to the roughing stands 14 and further onto the finishing stands 16 before reaching the cooling stands 18 and coilers 20. The coiled steel is sent away for further processing. For example, the coiled steel may be sent to cold rollers, picklers or shipped to another facility.

Plant recycle water 120 is used to wash and descale slabs 110. Plant recycle water 120 is also used to cool and protect the loading rolls and other mill components. The plant recycle water flow rate may range from 20,000 to 40,000 gallons per minute when used for descaling the slabs and the compressed water may blow scale away at a rate of 3 to 5 feet per second. The plant recycle water and scale are carried via flumes 30, 32, 34, 36 to scale pits 22, 24, 26, 28, respectively where scale is separated from water 120 so the scale can be collected.

The pits 22, 24, 26, 28 are very wide when compared to the flumes 30, 32, 34, 36 so the water speed decreases and the constituents in the flume settle. Oil rises to the top and scale settles to the bottom. Conventionally, the scale is then retrieved from the pits. Care must be taken to retrieve the scale without contaminating the scale with the oil.

In accordance with the present invention, scale may be collected from flumes 30, 32, 34, 36 before the scale reaches pits 22, 24, 26, 28. The inventors have found that collecting the scale directly from the flumes while the water is flowing results in the collection of cleaner scale. The inventors have also found that collecting scale as close to the source of scale formation as possible also results in the collection of cleaner scale.

In accordance with a preferred embodiment of the present invention, separators 40, 42, 44, 46 connected to flumes 30, 32, 34, 36 are used to collect scale. Separators are known and used for storm water treatment. Separators separate liquid from solid matter. HEADCELL Grit Separators manufactured by International Hydro may be preferable.

Figure 2:
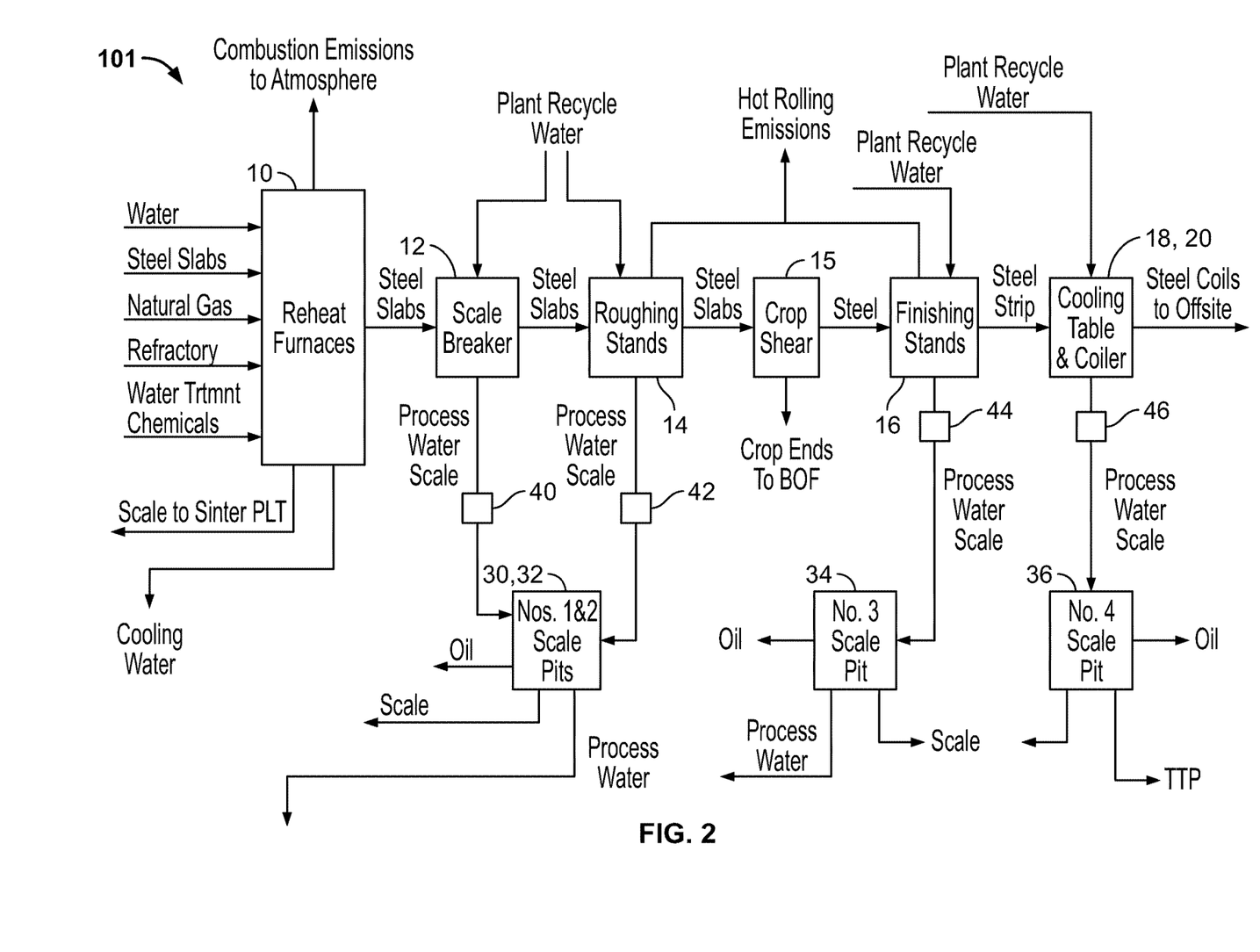
FIG. 2 shows another schematic drawing of a hot rolling mill including separators in accordance with the present invention.
Figure 3:
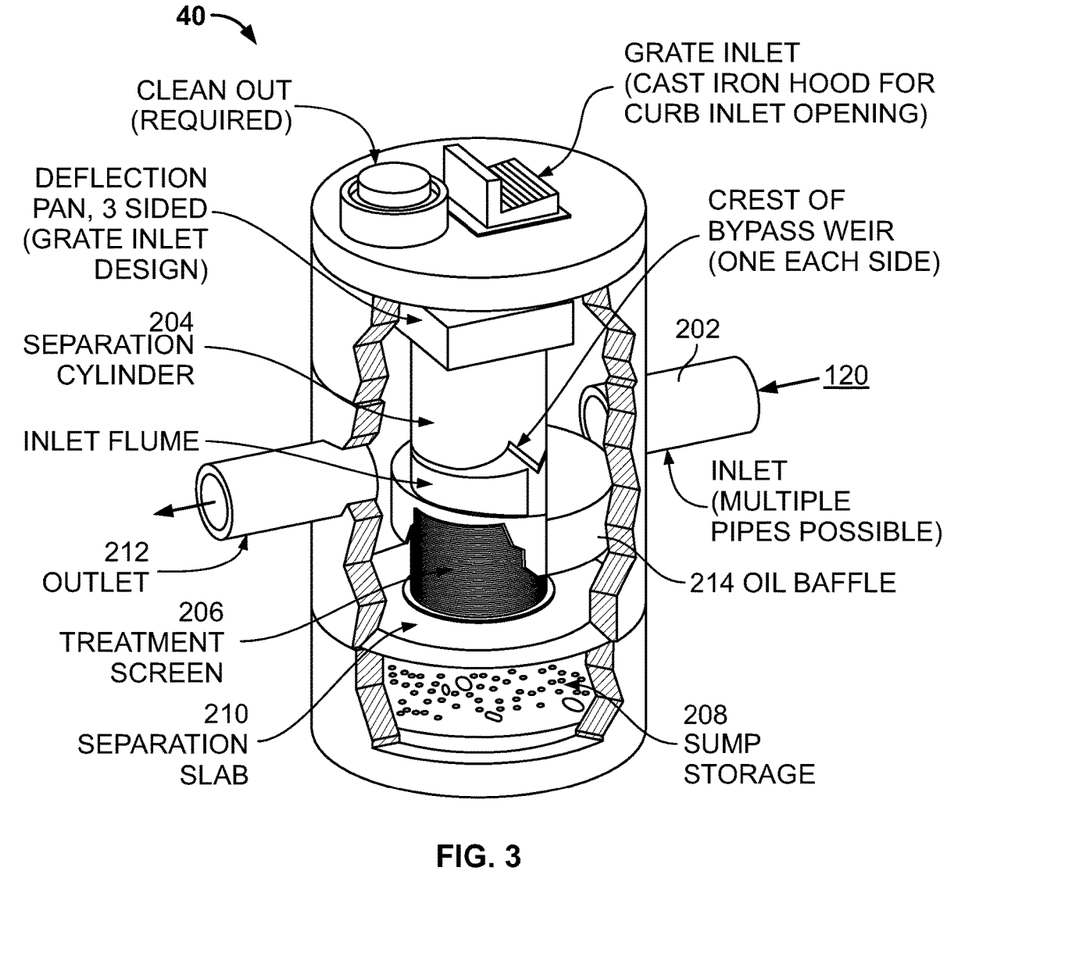
FIGS. 3 to 6 show a continuous deflection separation separator and flow patterns in accordance with the present invention.
Figure 4:
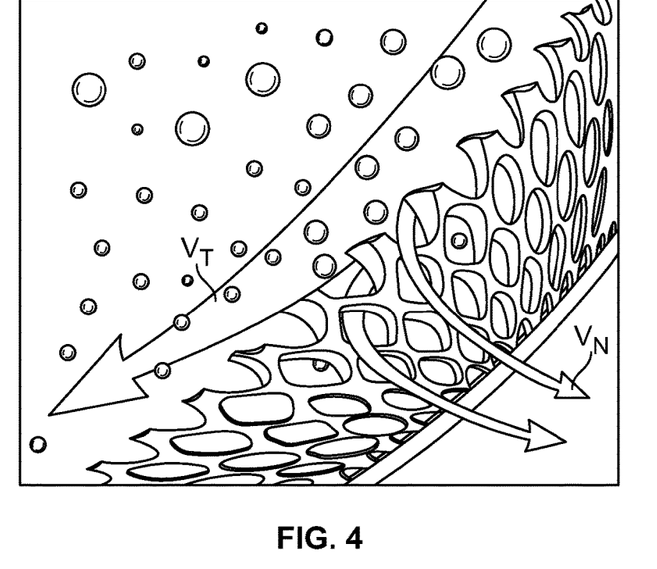

FIG. 2 shows another schematic representation of a hot rolling mill 101 including separators 40, 42, 44, 46 connected to flumes 30, 32, 34, 36 which are used to collect scale "in process" during a hot rolling mill operation. The same reference numerals used in FIG. 1 are used to represent similar components.

Grit separators and "CDS" separators treat a large range of storm water flows and conditions. These technologies employ multiple primary clarification treatment processes to remove pollutants from storm flows in a very small footprint including, deflective screening/filtration, swirl concentration, diffusion settlement and baffling.

FIGS. 3 to 6 show a separator 40, for example, a CDS separator and flow patterns. Wastewater enters deflective separation chamber 204 tangentially through inlet 202, multiple inlets 202 may be provided. The inlet 202 is located above the cylindrical screen 206 which is located above the sump 208 and separated therefrom by a separation slab 210.

The flow is introduced smoothly along a circumference of the stainless steel screen 206. A balanced set of hydraulic forces is produced in the separation chamber 204 and provides continuous moving flows across the steel screen surface 206, preventing any clogging of the apertures and establishing the hydraulic regiment necessary to separate solids through continuous deflective separation and swirl concentration separation.

The screens 206 separate out the solid matter and the sumps 208 accommodate the storage of deposition material below the separation chamber 204. The continuous deflective separation process produces a low energy, quiescent zone 203 in the center of the swirling chamber 204, which is different from the typical vortex separation process. In a simple gravity based vortex system, rotational velocities increase closer to the center of the unit. The calm zone in a CDS unit enables effective settlement of fine particles through a much wider range of flow rates than could otherwise be achieved using a simple settling tank in the same footprint. Particles within the diverted treatment flow are retained by the deflective screening chamber 204 and are maintained in a circular motion that diminishes in the center of the unit. Dense particles (Specific Gravity>1) ultimately settle into the sump 208 located below the separation chamber 204. The sump 208 is isolated from the separation chamber 204 by a separation slab 210 at the bottom of the separation chamber, which creates a hydraulic shear plane and minimizes the influence of scouring. The pollutants captured in the sump 208 are isolated from high velocity bypass flows through the unit preventing the scouring loss of captured pollutants.

Mill scale particles are influenced by circular motion of the plant water flow 120 inside chamber 204 which force the particles outwards towards the screen 206. The screen 206 prevents the mill scale particles from moving outside the chamber 204. The tangential inflows 120 cause a rotational motion within the separation chamber 204 that is balanced to exceed the radial flow rate through the screen 206. The continuous motion in the separation chamber 204 ensures that the tangential force on particles keeps the particles in rotation and is greater than the radial force produced by the flow through the screen.

A turbulent boundary layer at the screen face 206 impedes small particles from crossing the screen 206. The configuration and orientation of the screen 206 causes particles to be deflected towards the center of the screen chamber where the quiescent zone (stagnant core) 203 exists. This impedance produced by the turbulent boundary layer 205 and the deflective force assists in overcoming centripetal forces that are exerted on entrained particles enveloped in the screened separation chamber 204. This turbulent boundary layer and deflective force make the CDS system more effective in retaining particles compared to classic smooth-walled swirl concentrators. In comparison, the gravity-based smooth-wall swirl concentrators predominately rely on toroidal forces to separate solids from liquids in swirl chamber. These toroidal forces are present in equal or greater magnitude within a CDS unit.

Treated water travels through the entire screen cylinder surface area 206, and then exits the separation chamber 204 via outlet 212. This is a very large flow path area, resulting in very low exit velocities. This low underflow rate greatly enhances the separation capacity of the CDS solids separation process beyond that of a basic smooth cylinder walled vortexing unit. Besides the quiescence zone 203 in the center of the swirl separation chamber 204, low flow velocities also occur in the annular spaces 207 behind the screen. The flow passing through the separation screen 206 is greatly dispersed. After crossing the screen surface 206 into the annular space 207, the flow has extremely low velocity compared to the entrance 202, separation chamber 204 and exit 212 velocities. Quiescent settling occurs in this annular space 207 before the flow 120 travels beneath the oil baffle 214 and exits the unit 40.

Figure 5:
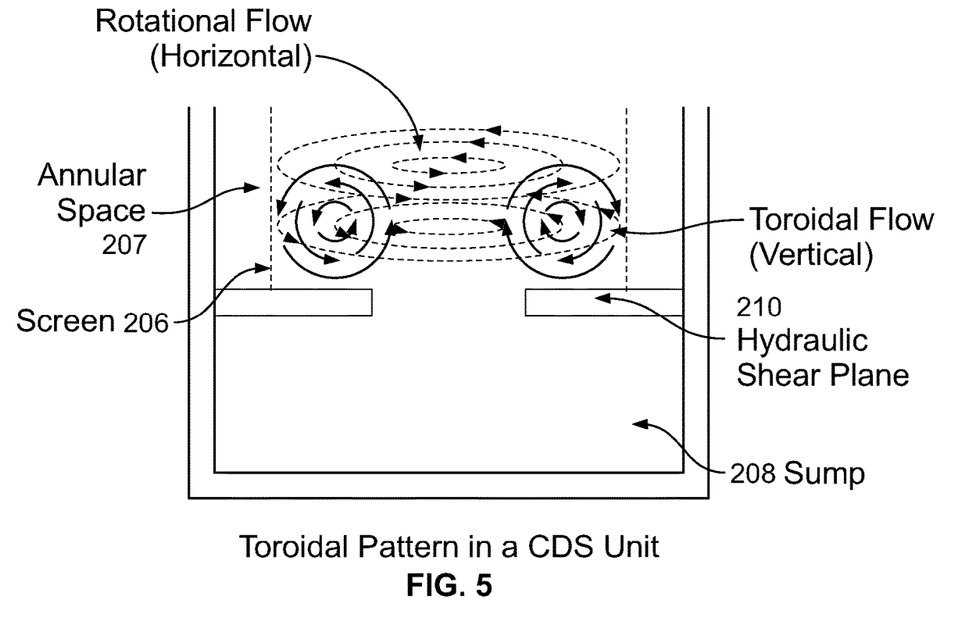
Figure 6:
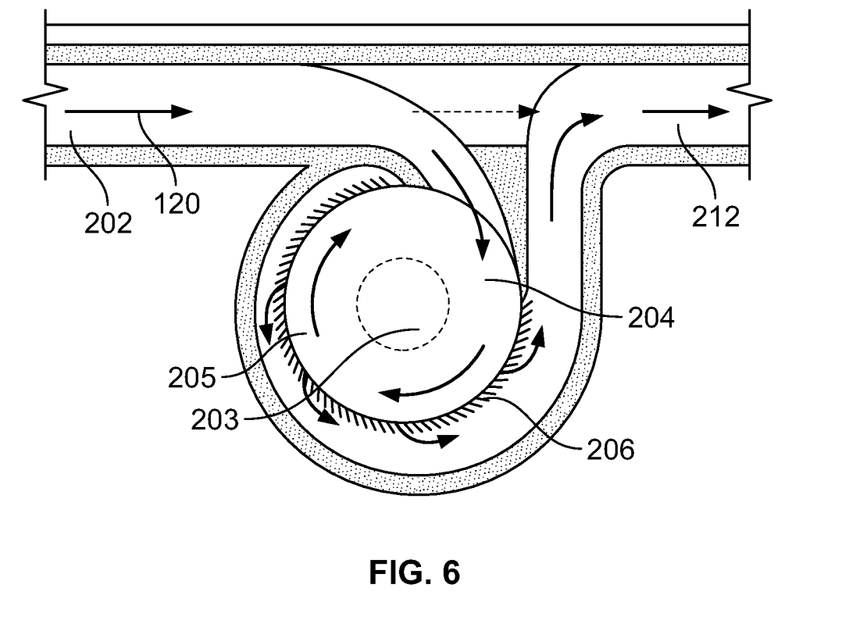

The toroidal flow motion within the separation chamber of a CDS unit is shown as the circular flow lines (FIG. 5). These toroidal flow forces are perpendicular to the horizontal rotation flow at the screen face 206 and assist in moving particles to the center 203 of the CDS treatment chamber 204 where the particles settle into sump 208 later on.

Figure 7:
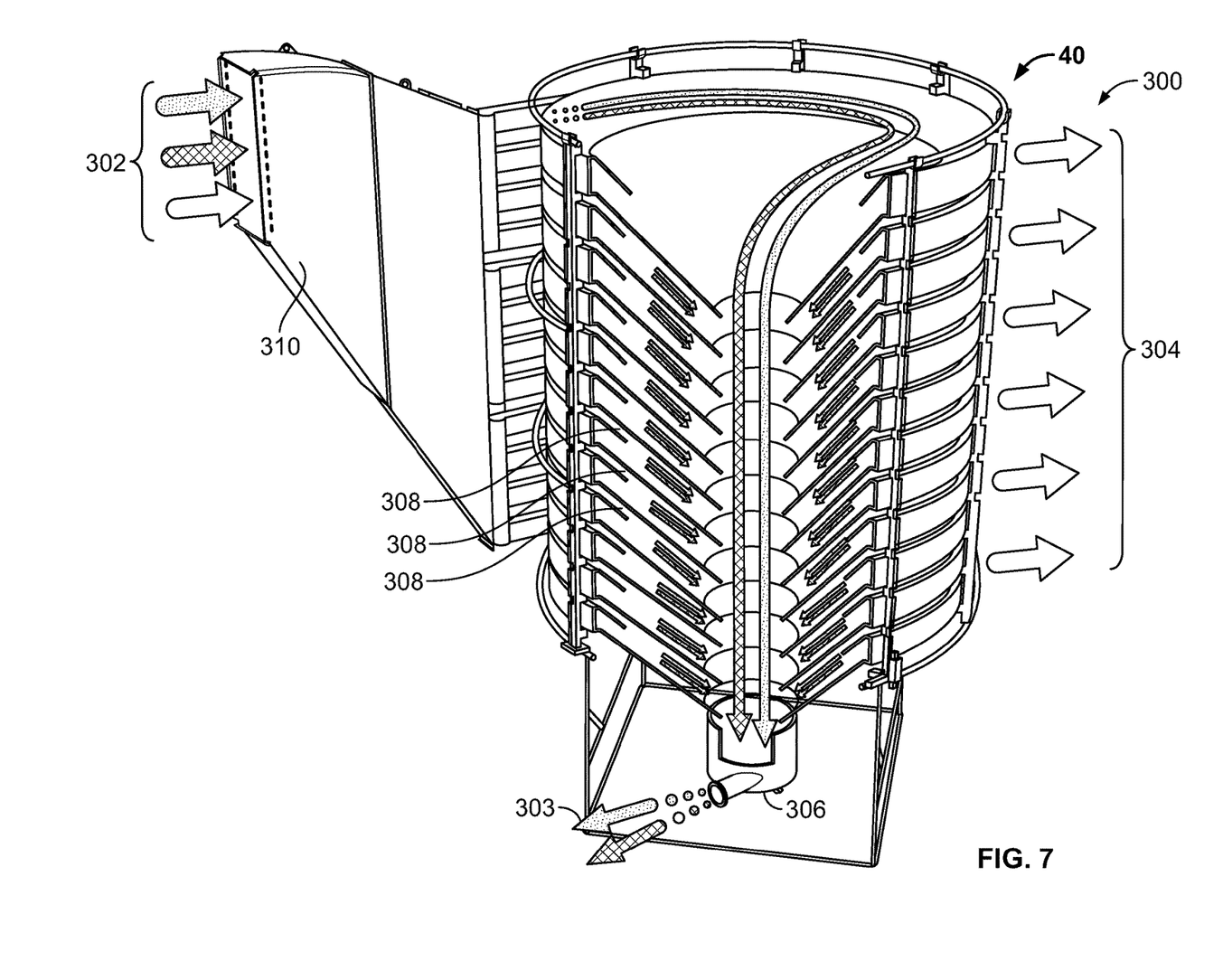
FIGS. 7 to 9 show a preferred embodiment of a grit separator in accordance with the present invention.
Figure 8:
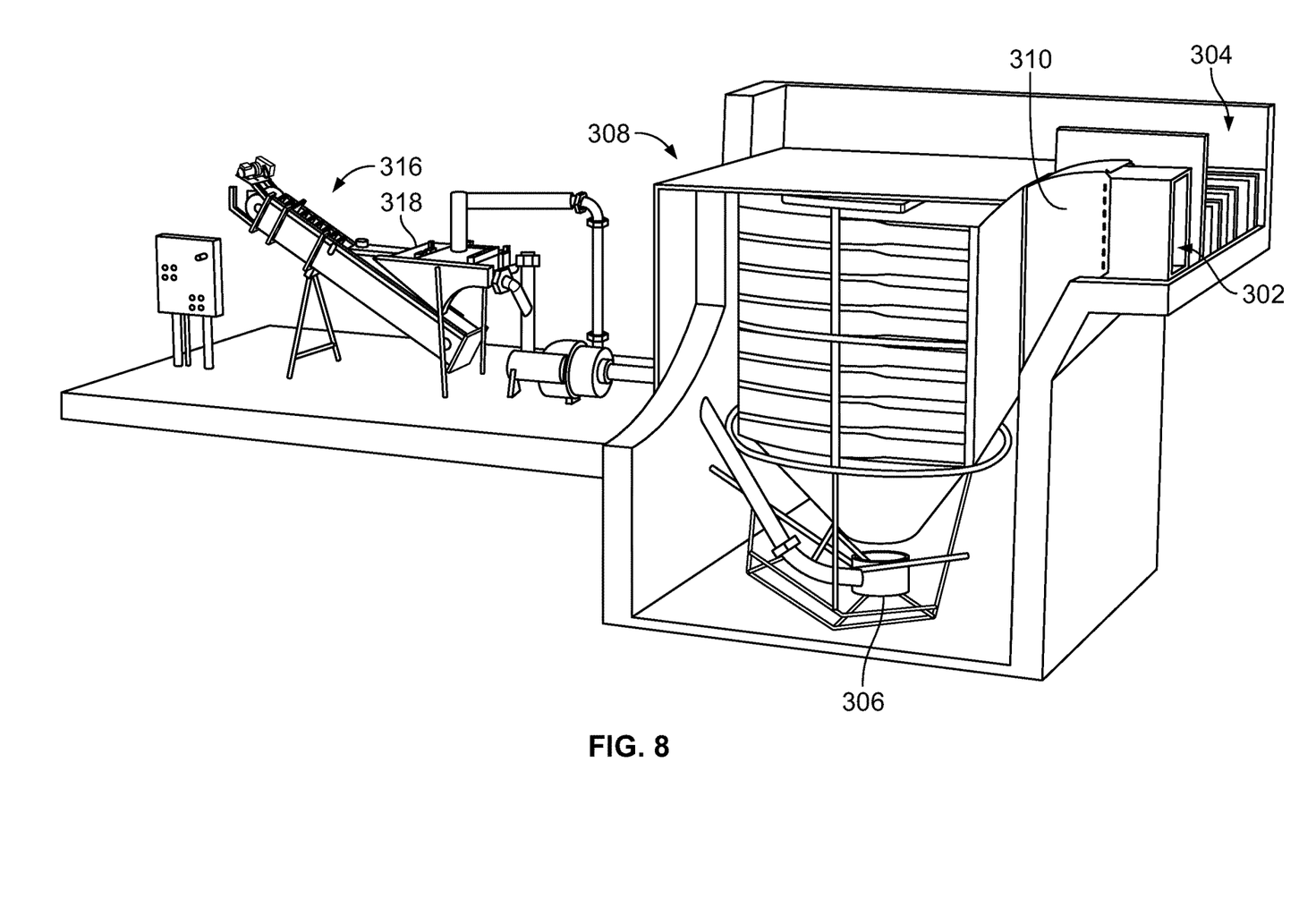
Figure 9:
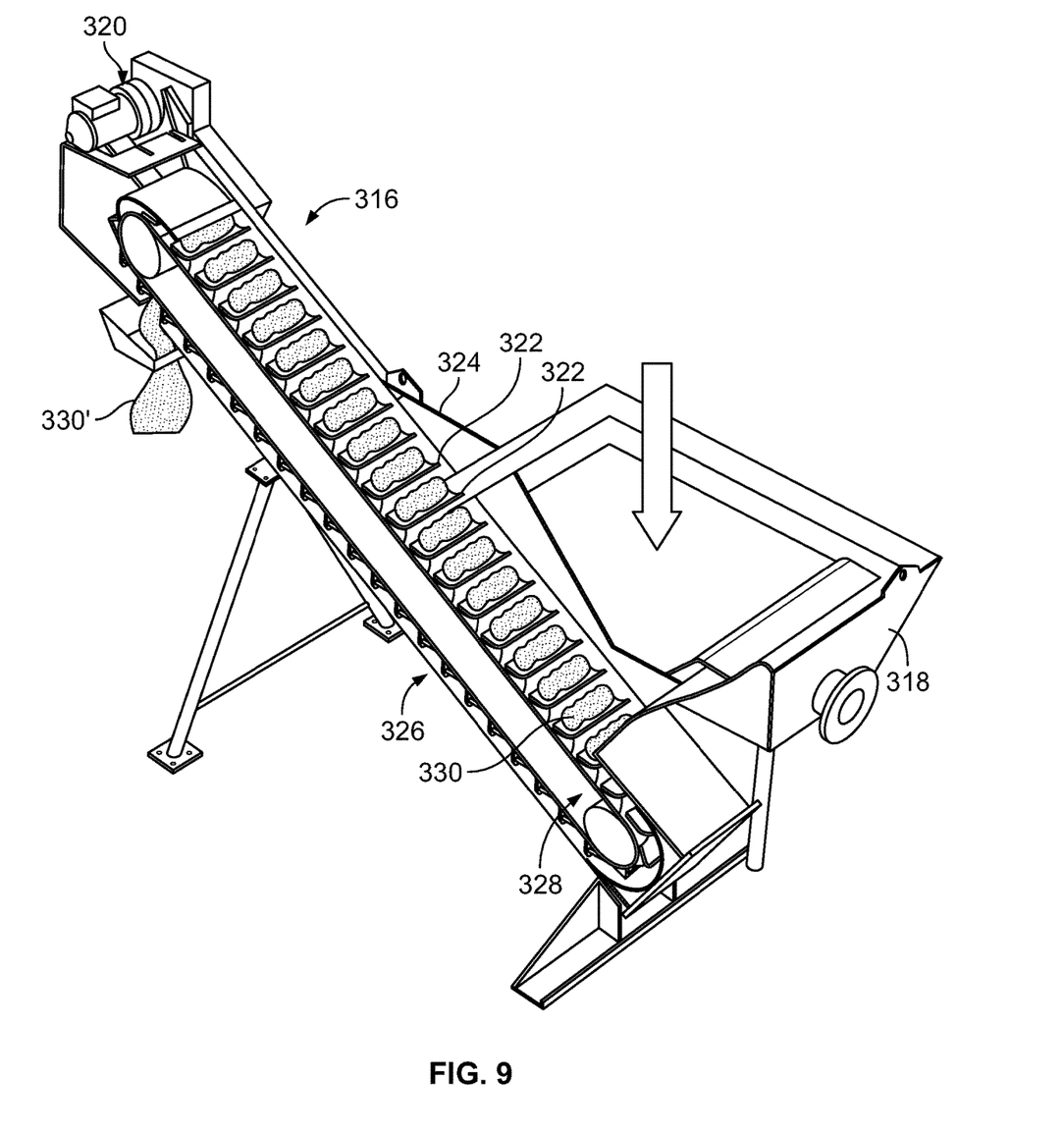

FIGS. 7 to 9 show a preferred embodiment of the present invention, which includes using a separator 40 which is a grit separator 300. The grit separator 300 may be for example, the HEADCELL by Hydro International and other related processing equipment including, for example, the GRITSNAIL and SPIRASNAIL both by Hydro International.

Grit separators 300 are located in the flumes 30, 32, 34, 36 see, for example, separators 40, 42, 44, 46 (FIG. 1). Grit separator 300 is used with a dewatering device 316. Grit separator 300 captures cleans and removes fine grit, abrasions and high-density solids from wastewater including the iron rich mill scale.

Each grit separator 300 includes a displacement header 310 in which influent (grit, volatile solids, oil and wastewater) 302, enter separator 300. Influent 302 enters settling trays 308 tangentially via the distribution header 310. The influent 302 is split equally among the different trays 308 which establishes a rotary flow pattern and maximizes contact of the grit on the surface area of the trays 308. The grit 303 drops via gravity to the underflow collection sump 306 at the bottom of the separator 300. The degritted effluent 304 leaves the chamber via a weir located on a wall 312 of chamber 301. The degritted effluent wastewater 304 carries oil and other flow downstream to the pits 22, 24, 26, 28 (FIG. 1) for processing by the wastewater treatment system.

The separated grit/mill scale 303 exits separator 300 via collection sump 306 and is sent to a dewatering device 316 to be dewatered. FIG. 9 shows a dewatering device 316. The dewatering device may include those manufactured by Hydro International such as, the GRITSNAIL and SPIRASNAIL. Dewatering device 316 includes a tank 318 containing the washed grit from washing device 314. A conveyor 326 moves grit 330 from tank 318. The conveyor includes rinse spray bars 322, a grit leveler 324, a tailroll rinse 328 and a motor 320. Clean dry grit 330' is output from the dewatering device 316. The clean dry grit 330' may be used internally or sold at higher prices than contaminated or oily grit. By separating the clean mill scale from the wastewater in the flume, clean mill scale can be generated, used internally or sold. In addition, less solids will go to the pits and wastewater treatment system so the treatment cost will decrease.

The separators may be incorporated into basic oxygen furnaces to separate steelmaking wastewater as well. In the BOF, the separators, and for example, the HEADCELL separator replaces existing grit separation devices which reduces costs. The HEADCELL separator directly connects to a dewatering device, eliminating the need for a pump.

Figure 10:
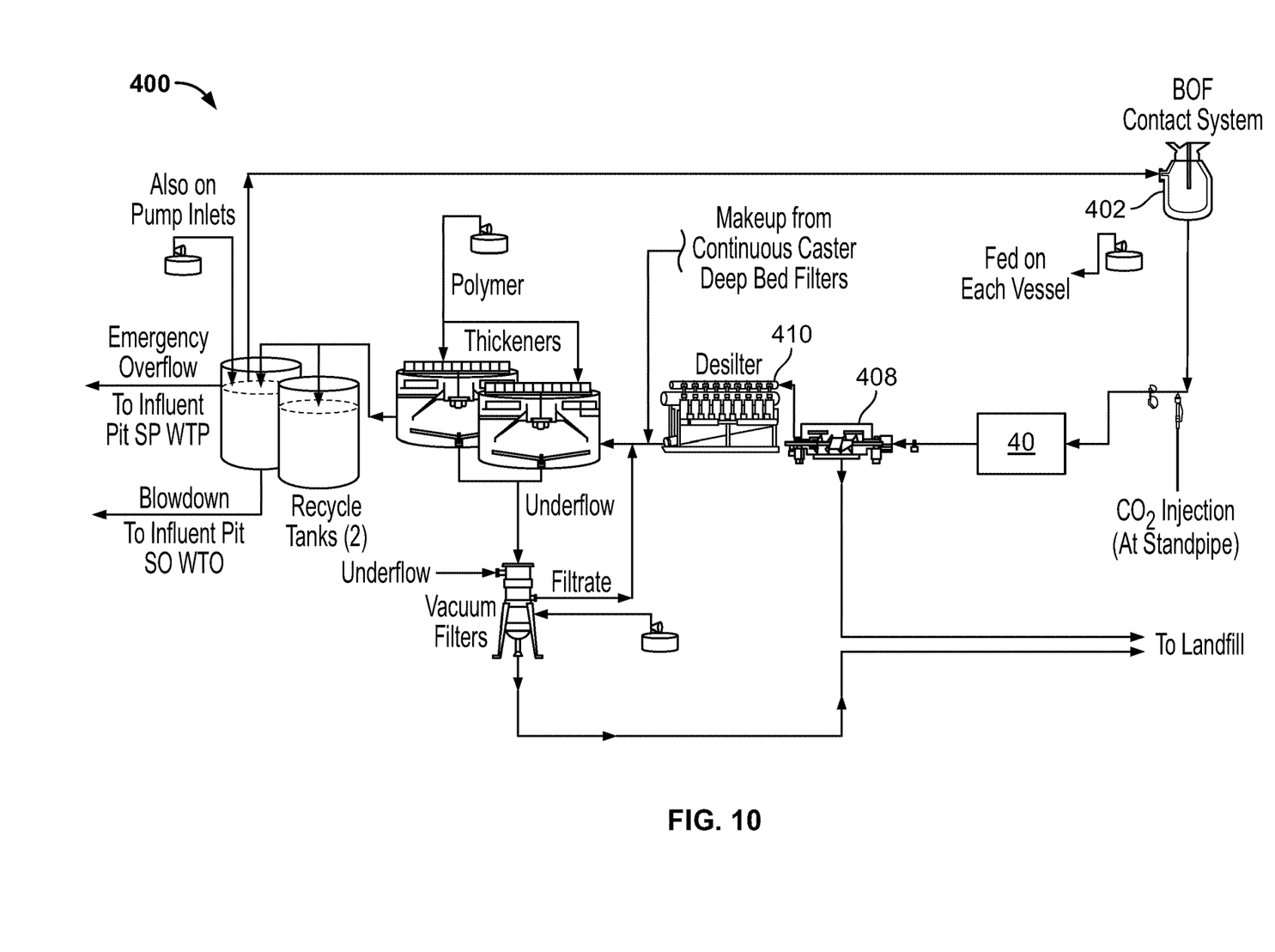
FIGS. 10 and 11 show preferred embodiments of basic oxygen furnaces including a grit separator in accordance with the present invention.

FIG. 10 shows a BOF system 400 which includes a BOF 402 and a complete wet BOF offgas cleaning system. In this kind of system, BOF offgas is cleaned solely by water. Grit in wastewater is often captured via desilters 410 or hydrocyclones 408. Problems with desilters and hydrocyclones are lower efficiency and lack of dewatering. In accordance with a preferred embodiment of the present invention, a grit separator 40 is used in the BOF system 400. Grit separator 40 may replace a desilter and/or hydrocyclones. The grit separator 40 is able to extract the grit from the wastewater and dewater the grit. Thus, using a grit separator may reduce the amount of waste taken to a landfill and overcome the two disadvantages associated with desilters and hydrocyclones.

Figure 11:
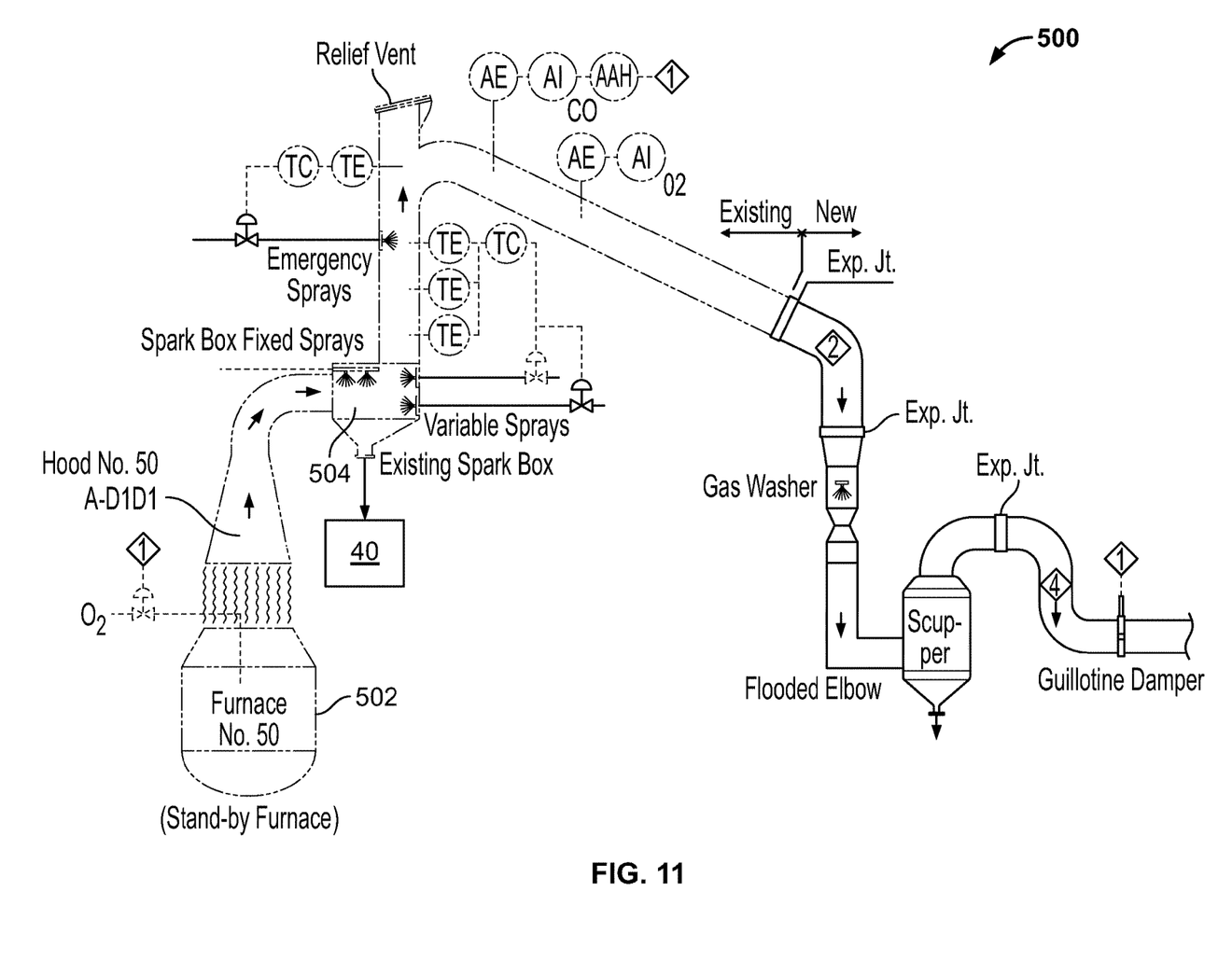

FIG. 11 shows a BOF system 500 which includes a BOF 502 and spark box wastewater treatment 504. The spark box 504 cools the gases released from the BOF 502 by spraying the gases with water. Grit and other waste material are generally collected and taken to clarifiers or trailers and slag pots. In accordance with the present invention, a grit separator is used to treat the flowing turbulent wastewater. The grit separator 40 is able to separate clean scale from the wastewater more effectively than collecting the waste as previously known.

Spark box wastewater treatment can be in wet-dry offgas cleaning systems or complete wet offgas cleaning systems. Underneath the spark box 504, wastewater is currently collected with containers like trailers or slag pots. Solids can settle down and water can overflow. After sometime, the containers will be hauled away and dumped somewhere to drain the solids. This practice often ends up with low efficiency, high cost and messy floor environment. Using the grit separators 40 to replace the containers can have advantages of lower cost, higher efficiency and environmental integrity.

The present inventors recognize that separators as known in stormwater treatment and residential wastewater treatment may be modified or optimized for use in hot rolling mills. For example, the separators must be adapted for large scale industrial application in the steel industry. The quantity of scale is large and must be transported continuously whereas current separators are used to treat storm events and are not subject to continuous use. In addition, there is no need to warry about floatables, debris that floats to the top of the flow. Furthermore, it is desirable for oil that has contaminated the plant recycle water to continue to flow out downstream with the plant recycle water. Oil accumulation is not desired in the separator.

The components of the separator, including the screen, must be optimized to accommodate the scale size and to accommodate the existing flumes. The mill scale is heavier than sand, for example, scale density is about 5.0 and sand density is about 2.0. The components of the separator should also utilize materials that resist wearing down by the mill scale, oil and plant recycle water.

The present invention may also be incorporated into hot rolling mills for other metal products, for example, copper and aluminum. The present invention also includes retrofitting an existing hot rolling mill or basic oxygen furnace by placing a separator into a flume of the mill.

Using a separator in the flume to separate grit and mill scale from the wastewater will reduce capital costs and operating costs.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for collecting mill scale from a hot rolling mill, the hot rolling mill including a flume, the method comprising the steps of:
    transporting mill scale particles in wastewater;
    retrieving the wastewater from a flume of the hot rolling mill; and
    separating the mill scale particles from the wastewater using a separator located in the flume; wherein the wastewater is turbulent in the flume and the separator is located in the turbulent wastewater.

2. The method as recited in claim 1 wherein the separator is a grit separator.

3. The method as recited in claim 1 further comprising the step of:
    collecting the mill scale particles.

4. The method as recited in claim 3 further comprising the step of:
    dewatering the collected mill scale.

5. The method as recited in claim 1 wherein the separator is provided downstream from a reheat furnace, scalebreaker, roughing stand, cooling stand or finishing stand.

6. The method as recited in claim 1 wherein the separator is located upstream of a pit.

7. The method as recited in claim 1 further comprising the step of:
    directing the wastewater downstream of the separator in the hot rolling mill.

8. The method as recited in claim 7, wherein the wastewater is directed further to a pit.

9. The method as recited in claim 1, wherein the mill scale is separated from the wastewater in accordance with the following formula:
wherein:

$$c = \frac{hu\tau}{dp}, \% \text{ wt};$$

c is oil concentration in the collected mill scale in % wt,
h in g/(mm$^2$*s) is a coefficient,
u is oil content in wastewater in % wt before mill scale is collected,
$\tau$ is contact time in s between scale particles and oil droplets before the scale is collected; and
d in mm and p in g/mm$^3$ are size and density of the collected scale.

10. The method as recited in claim 1 wherein the separator includes separation trays.

11. The method as recited in claim 1, further comprising the step of:
    washing the mill scale particles.

12. The method as recited in claim 1, wherein the separator directly connects to a dewatering device.

* * * * *